United States Patent
Yamashita et al.

(10) Patent No.: US 10,656,803 B2
(45) Date of Patent: *May 19, 2020

(54) ADAPTIVE BACKGROUND PLAYBACK BEHAVIOR

(71) Applicant: GOOGLE LLC, Mountain View, CA (US)

(72) Inventors: Yuhki Yamashita, San Francisco, CA (US); Matt Ward, San Francisco, CA (US); Bryce Gibson Reid, San Francisco, CA (US)

(73) Assignee: Google LLC, Mountain View, CA (US)

(*) Notice: Subject to any disclaimer, the term of this patent is extended or adjusted under 35 U.S.C. 154(b) by 127 days.

This patent is subject to a terminal disclaimer.

(21) Appl. No.: 15/601,529

(22) Filed: May 22, 2017

(65) Prior Publication Data

US 2017/0255354 A1    Sep. 7, 2017

Related U.S. Application Data

(63) Continuation of application No. 14/332,329, filed on Jul. 15, 2014, now Pat. No. 9,665,248.

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 9/485* (2013.01); *H04N 21/4333* (2013.01);
(Continued)

(58) Field of Classification Search
CPC combination set(s) only.
See application file for complete search history.

(56) References Cited

U.S. PATENT DOCUMENTS

2012/0092435 A1   4/2012   Wohlert
2012/0209413 A1   8/2012   Xu et al.
(Continued)

FOREIGN PATENT DOCUMENTS

| | | |
|---|---|---|
| CN | 103258553 A | 8/2013 |
| EP | 2627097 A2 | 8/2013 |
| JP | 2008022566 A | 1/2008 |

OTHER PUBLICATIONS

International Searching Authority, "International Search Report and the Written Opinion of the International Search Authority," for International Application No. PCT/US2015/037503, dated Sep. 16, 2015, 12 pages.

(Continued)

*Primary Examiner* — Pei Yong Weng
(74) *Attorney, Agent, or Firm* — Foley & Lardner LLP

(57) ABSTRACT

A method for determining playback behavior of a media item including a video component and an audio component includes determining a current event that causes a playing of the video component of the media item on a screen of a user device to be suspended. The method further includes predicting user playback preferences for the media item using a behavioral model trained on previous events corresponding to the current event, and determining, based on the predicted user playback preferences, whether to continue playing the audio component of the media item.

20 Claims, 5 Drawing Sheets

(51) Int. Cl.
  *H04N 21/433*  (2011.01)
  *H04N 21/434*  (2011.01)
  *H04N 21/439*  (2011.01)
  *H04N 21/485*  (2011.01)
  *H04N 21/6379*  (2011.01)
  *G06F 9/48*  (2006.01)
  *H04N 21/442*  (2011.01)

(52) U.S. Cl.
  CPC ..... *H04N 21/4341* (2013.01); *H04N 21/4396* (2013.01); *H04N 21/485* (2013.01); *H04N 21/6379* (2013.01); *H04N 21/4424* (2013.01)

(56) References Cited

U.S. PATENT DOCUMENTS

| | | | |
|---|---|---|---|
| 2012/0209961 A1* | 8/2012 | McCoy | H04N 21/4333 709/219 |
| 2012/0311608 A1 | 12/2012 | Park et al. | |
| 2013/0209065 A1* | 8/2013 | Yeung | H04N 21/41407 386/248 |
| 2013/0346896 A1 | 12/2013 | Missout | |
| 2014/0187200 A1 | 7/2014 | Reitter et al. | |
| 2015/0213839 A1 | 7/2015 | Woodman et al. | |

OTHER PUBLICATIONS

Final Office Action on U.S. Appl. No. 14/332,329 dated Oct. 5, 2016 (12 pages).
Non-Final Office Action on U.S. Appl. No. 14/332,329 dated Jun. 27, 2016 (11 pages).
Notice of Allowance on U.S. Appl. No. 14/332,329 dated Jan. 23, 2017 (8 pages).

* cited by examiner

ADAPTIVE BACKGROUND PLAYBACK BEHAVIOR

CROSS-REFERENCE TO RELATED APPLICATIONS

This application is a continuation of U.S. patent application Ser. No. 14/332,329, filed Jul. 15, 2014, entitled "ADAPTIVE BACKGROUND PLAYBACK BEHAVIOR", which is hereby incorporated by reference in its entirety.

TECHNICAL FIELD

This disclosure relates to the field of content-sharing platforms and, in particular, to methods and systems for the handling of media items when in a background mode.

BACKGROUND

On the Internet, content-sharing platforms and content-distribution platforms, like social networks, subscription media services, and others, allow users to consume a variety of media items and may allow users to connect to and share information and media items with each other. Many social networks include a content-sharing aspect that allows users to upload, view, and share content, such as video content, image content, audio content, and so on (which may be referred to as "media items" or "content items"). Such media items may include professionally produced audio clips, movie clips, TV clips, and music videos, as well as amateur content such as video blogging, short original videos, pictures, photos, audio recordings, other multimedia content, etc. Users may use computing devices (such as smartphones, cellular phones, laptop computers, desktop computers, netbooks, and tablet computers) to access the content-sharing and distribution platforms to use, play, share, and/or consume media items (e.g., watch digital videos, and/or listen to digital music).

Because so many different types of media items may be available to users of a given content platform, such a platform may have a variety of uses. For example, even though many of the media items of a content platform may include both video components and audio components, users of the content platform may not want to receive both the video and audio components in certain circumstances. While efforts have been undertaken to facilitate user control in this regard, these efforts have not been entirely satisfactory.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular embodiments of the disclosure or any scope of the claims. Its sole purpose is to present some concepts of the disclosure in a simplified form as a prelude to the more detailed description that is presented later.

In one implementation, a computer-implemented method of providing adaptive background playback behavior is described herein. The method includes steps of playing a media item in a media viewer executing on a processor of a computing device. The media item includes both an audio component and a video component. The method further includes steps of detecting an event that causes the playing of the video component of the media item to be suspended and of identifying data pertaining to user behavior associated with the event. Additionally, the method includes determining whether to continue playing the audio component of the media item in view of the identified data.

In another implementation, a computer-implemented method of providing adaptive background playback behavior is provided herein. The method includes steps of receiving, by a processor of a server device, information on user behavior associated with a media item being played on a client device and also receiving an indication of an event causing the playing of a video component of the media item to be suspended. The method further includes steps of predicting a background playback preference of a user of the client device in response to receiving the information and the indication of the event and of providing, to the client device, instructions on whether to continue playing an audio component of the media item in accordance with the predicted background playback preference of the user.

In additional implementations or embodiments, computing devices for performing the operations of the above-described implementations are also disclosed. Systems with a processing device and a memory including instructions that when executed by the processing devices cause the processing device to perform operations corresponding to the disclosed methods are also provided. Additionally, in some implementations of the disclosure, a non-transitory computer-readable storage medium stores instructions for performing the operations of the above described implementations.

BRIEF DESCRIPTION OF THE DRAWINGS

Aspects of the present disclosure are illustrated, by way of example and not by way of limitation, in the figures of the accompanying drawings.

Figure 1:
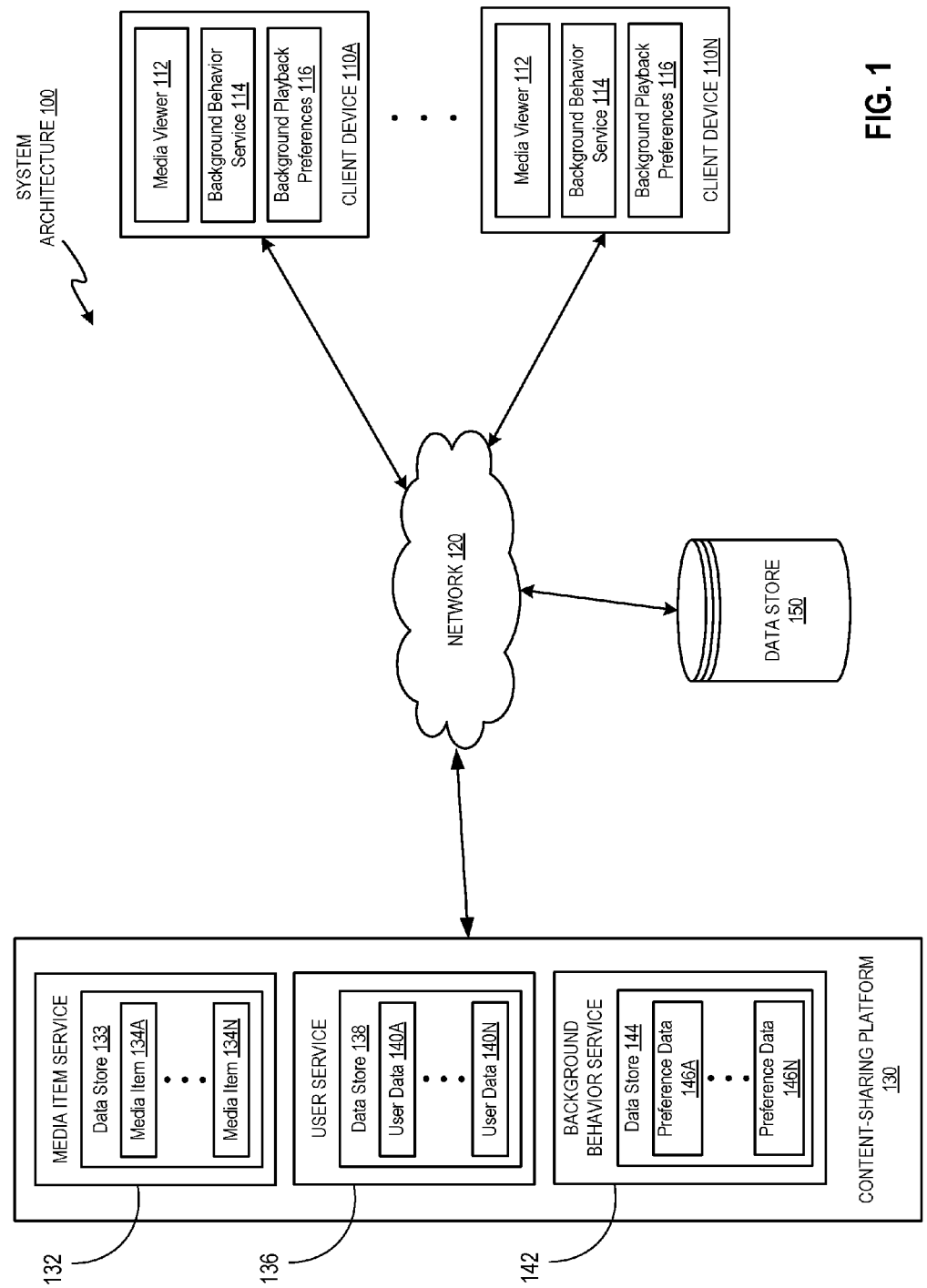
FIG. 1 illustrates an exemplary system architecture for adaptive background playback behavior, in accordance with an embodiment of the disclosure.

These drawing may be better understood when observed in connection with the following Detailed Description.

DETAILED DESCRIPTION

Implementations are described for facilitating formation and application of adaptive playback preferences for media items from an Internet-based media platform. Internet-based media platforms have become increasingly important channels for the distribution and consumption of media content such as movies, television, videos, music, photography, and text. As more media distribution has migrated onto such platforms, the amount of content available has increased dramatically. These Internet-based media platforms may include platforms that permit ordinary users to upload media items (referred to herein as content-sharing platforms) and platforms in which ordinary users merely consume media items (referred to herein as content-distribution or contentpresentation platforms). These different types of platforms are not mutually exclusive, but may instead represent an area of focus of a given platform. While the examples of this disclosure are expressed as being directed to a content-sharing platform, the principles and scope are applicable in other Internet-based media platforms as well.

Content-sharing platforms may include various categories of media items, which may in turn include various sub-categories of media items. For example, music videos may include "professional" music videos, in which both the audio and the video are professionally produced. Music videos may also include lyric videos, in which an audio component is presented with a video component that shows the lyrics of the audio component in text, with or without accompanying designs and graphics. Music videos may also include media items in which the audio component is not necessary related to the video component. For example, a snowboarding enthusiast may create and upload a media item that includes video, taken by the snowboarding enthusiast while snowboarding, with a music track written and performed by a favorite band of the snowboarding enthusiast. Various degrees of connection may exist between the audio and video components of a given media item.

In some instances, users of the content-sharing platform may be interested in one component (e.g., the audio component) of a media item, but not interested in the other component (e.g., the video component). For example, the user of the content-sharing platform may want to hear the music in the audio component of the snowboarding media item, briefly described above, but may not be interested in watching the video taken by the snowboarding enthusiast. As another example, the user may want to watch to video without hearing the audio component. Implementations of the present disclosure are directed to providing the user with the desired component but not the undesired component, under certain circumstances.

Users may access the content-sharing platform using a variety of client devices. For example, a user may access the platform with a desktop or laptop computer, a tablet, a smartphone, a wearable computer, an in-dash computer in an automobile, etc. These different client devices may access the content-sharing platform in different ways, such as over a wired network, a Wi-Fi network, or a cellular network, etc. The data traffic over each these different networks may have different costs. Additionally, the user interfaces of these client devices may be different and may provide for different interaction paradigms, such as multitasking or monotasking, etc. For example, if a user accesses the content-sharing platform through a media consumption application (e.g., a "mobile app") using a smartphone, and the user then wants to check his email, the media consumption application should be moved to the background to allow the user to check mail. The media consumption application is sent to a background of the display, and potentially a background of the operation system of the device, while the email application is presented to the user. If the user is interested in a media item, being played by the media viewer application, for the audio component and not for the video component, the user may have a preference for continuing the playback of the audio component even while the video component is suspended or stopped. Simply put, if the user only wants to hear the music of a music video, an event causing the video component to be suspended or to stop may not be an event that should cause the audio to stop. However, the user may want the audio component to stop when the video component stops, if a certain event occurs. This disclosure is directed toward providing adaptive background playback behaviors that differ when different events occur. While many examples herein are directed toward embodiments in which audio may be continued while video is suspended, in some circumstances, the user may want to continue watching the video component when another audio component is given priority on the user's device. For example, the user may want to continue watching a video component while receiving a phone call.

Implementations of the present disclosure enable a user of a content-sharing platform in which media items include multiple components to only consume one component of a media item when various events occur. For example, the client device of the user may stop the video component when the user turns off the display, goes to a "home" screen of the client device, switches between applications running on the client device, or navigates within an application to another page or interface. For example, when the user of a mobile phone pushes the "home" button thereof, the playing of a video component in a media viewer app may be suspended. As another example, when the user of a mobile phone pushes the "back" button, the video component may be suspended.

While in some implementations of the present disclosure, background playback preferences may be established and enforced locally, in other embodiments the background playback preferences may be at least partially implemented by the content-sharing platform. Through the use of an adaptive background playback behavior system and associated methods, the content-sharing platform can determine whether the audio component should continue playing for the user when the video component stops being displayed. Thus, embodiments of the present disclosure may enable each user to determine how one component of a media item should be handled when another component is stopped or suspended by an event.

FIG. 1 illustrates an exemplary system architecture 100 for the sharing, distributing, and displaying of media items, in accordance with an embodiment of the disclosure. The system architecture 100 includes a plurality of client devices, illustrated as client devices 110A through 110N. The system architecture further includes a network 120, a content-sharing platform 130, and a data store 150. In some embodiments, these features may operate to provide adaptive background playback behavior for the users of the content-sharing platform 130.

In one embodiment, network 120 may be a public network (e.g., the Internet), a private network (e.g., a local area network (LAN) or wide area network (WAN)), a wired network (e.g., Ethernet network), a wireless network (e.g., an 802.11 network or a Wi-Fi network), or a cellular network (e.g., a Long Term Evolution (LTE) network), having routers, hubs, switches, servers, and/or a combination thereof. In one embodiment, the data store 150 includes a memory (e.g., random access memory), a cache, a drive (e.g., a hard drive), a flash drive, a database system, a storage area network (SAN), or another type of component or device capable of storing data. The data store 150 may also include multiple storage components (e.g., multiple drives or multiple databases) that may also span multiple computing devices (e.g., multiple server computers) and storage devices such as may be present in a data center. Thus, in some embodiments, the data store 150 may be a data center. In some embodiments, the network 120 may not be present at all times. In such embodiments, one or more media items may be offlined or saved to a client device 110A and the functions of the media item service 132, the user service 136 may be provided by the client device 110A without an active connection via the network 120.

The client devices 110A-N may each include computing devices such as personal computers (PCs), laptops, mobile phones, smartphones, tablet computers, wearable computing devices, etc. Client devices 110A-N may be used to consume (e.g., view, hear, etc.) and upload content to the content-sharing platform 130. In some instances herein, client device 110A-N may also be referred to as "user devices." Each client device includes a media viewer 112. In one embodiment, the media viewers 112 may be applications that allow users to receive visible content, such as images, videos, web pages, documents, etc., and audio content such as live audio and sound recordings. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media viewer) on the client device to a user thereof.

The media viewer 112 may also display an embedded media player (e.g., a Flash® player or an HTML5 player) that is embedded in a web page (e.g., a web page that may provide information about a product sold by an online merchant, a content-sharing platform such as a social network). In another example, the media viewer 112 may be a standalone application, such as smartphone application or "app," that allows users to consume digital media items (e.g., digital videos, digital images, electronic books, shared text, etc.) as part of the content-sharing platform 130. The media viewer 112 may also render or present audio components of the content on a sound system of a client device, including an internal speaker of the client device 110A or an external speaker coupled to the client device 110A by an audio system connection. The audio system connection may be a wired connection, such as may use a ¼" or ⅛" electrical audio jack, an optical audio jack, or another connector capable of carrying the audio component in an analog or a digital format.

The media viewers 112 may be provided to the client devices 110A-N by the content-sharing platform 130 and/or a third-party distribution platform, such as an app distribution platform. For example, the media viewers 112 may be applications that are downloaded from a server accessible to the client devices 110A-N through the network 120 and then executed by a processing device of the client devices 110A-N.

The client devices 110A-N may also each include a background behavior service 114 and one or more background playback preferences 116, where the background behavior service 114 and the background playback preferences 116 may be part of the media viewer 112 or part of a different application on the client device 110A. The background behavior service 114 and the background playback preferences 116 are described herein with respect to the client device 110A. However, the descriptions of the functions and characteristics of the background behavior service 114 and the background playback preferences 116 are equally applicable to any of client devices 110A-N. The background behavior service 114 may monitor one or more subsystems of the client device 110A. For example, the background behavior service 114 may detect events on the client device 110A. Such events may include events that cause the playing of one of the components of a media item, such as the video component of the media item, to be suspended or otherwise sent to the background of the device.

The background behavior service 114 may use the event and/or information regarding the media item to apply one or more of the background playback preferences 116. In some embodiments, the background playback preferences 116 include one or more rules directing a particular background playback behavior to be implemented by the background behavior service 114 on the client device 110A when a triggering event occurs. The background playback preferences 116 may be specified by a user or be determined automatically based on prior user behavior.

For example, the background playback preferences 116 may include a rule that when a user pushes the home button on the client device 110A, thereby causing the media viewer 112 to be sent to the background of the client device 110A, an audio component of the media item should continue playing. In this way, the user may view the apps on the user's home screen and may select another app to execute while continuing to listen to the audio component of the media item. In some embodiments, the client device 110A may send a message to the content-sharing platform 130, upon execution of this exemplary rule, directing the content-sharing platform 130 to suspend sending data associated with the video component of the media item. The content-sharing platform 130 may thereafter stop sending data associated with the video component, but continue sending data associated with the audio component. In some embodiments, the execution of a rule as described by one or more of the background playback preferences 116 may not include altering the information sent from the content-sharing platform 130 to the client device 110A. In some embodiments, whether or not a request to stop the video component is sent to the content-sharing platform 130 may be a preference set by the user in a user interface, by the content-sharing platform 130, or by an operator of the network 130, such as a cellular communications carrier. Such preferences may be default preferences that can be overridden by the user. This and other preferences may be included in the background playback preferences 116.

In general, functions described in one embodiment as being performed by the content-sharing platform 130 can also be performed on the client devices 110A-N in other embodiments if appropriate. Thus, the functionality attributed to a particular component of the system architecture 100 may be performed by different or multiple components operating together or by the particular component alone. The content-sharing platform 130 can also be accessed as a service provided to other systems or devices through appropriate application programming interfaces (APIs), and thus is not limited to use in websites or particular applications.

In some embodiments, the content-sharing platform 130 includes one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content-sharing platform 130 may allow a user to consume, upload, search for, approve of ("like"), dislike, share, and/or comment on media items. The content-sharing platform 130 may also include a website (e.g., a web page) and/or a mobile computing application (e.g., an "app") that may be used to provide a user with access to the media items.

The content-sharing platform 130 may include media item service 132 with a media item data store 133 that includes a plurality of media items 134A-N. Examples of media items 134A-N can include, and are not limited to, digital video, digital movies, digital photos, digital music, website content, social media updates, electronic books (ebooks), electronic magazines, digital newspapers, digital audio books, electronic journals, blogs, real simple syndication (RSS) feeds, electronic comic books, software applications, etc. As used herein, "media," media item," "online media item," "digital media," "digital media item," "content," and "content item" can include and refer to an electronic file that can be executed, loaded, or played using software, firmware, or hardware configured to present the digital media item to a viewing user of the content-sharing platform 130.

The media items 134A-N may include one or more media items with metadata containing information regarding the media item. For example, the media item 134A may include metadata indicating a type or category of the media item. Types of media items may include digital videos, digital photos, etc., and may also include more narrowly described types of media items. For example, metadata for the media item 134A may indicate that the media item 134A is a television show, a feature film, a music video, a lyric video, an amateur video, etc. The metadata may indicate that the media item 134A is associated with one or more specific channels or with one or more playlists of the content-sharing platform 130 and may indicate who uploaded the media item 134A, a title and/or description of the media item 134A, one or more descriptive tags, etc.

The content-sharing platform 130 may further include a user service 136. The user service 136 may include a data store 138 including instances of user data 140A-N. The user data 140A-N may include information pertaining to users of the content-sharing platform such as consumption histories and/or playlists for the users of the content-sharing platform 130 and may identify interactions, such as approvals, disapprovals, comments, etc., that the users have had with one or more of media items 134A-N. In some embodiments, the content-sharing platform 130 may store the media items 134A-N using the data store 150. In such embodiments, the media items 134A-N may be pointers to corresponding media items as stored in the data store 150. The media items 134A-N may be retrieved from data store 150 prior to delivery to one or more of client devices 110A-N over network 120. Pointers may be included in the user data 140A-N as part of a user's consumption history, or another identifier may be used to indicate that a particular user has consumed a particular media item.

As illustrated in FIG. 1, the content-sharing platform 130 may further include a background behavior service 142. The background behavior service 142 may facilitate the creation and enforcement of one or more background playback preferences. In some embodiments, the background playback preferences 116 are provided to the client devices 110A-N by the background behavior service 142. In some embodiments, the background behavior service 142 may include a model for predicting background playback behavior preferences of each user. The model may represent one or more rules to be applied or implemented by the background behavior service 114 when received by the client devices 110A-N.

In some embodiments, information regarding user interactions with the media viewer 112 on the client device 110A may be provided to the background behavior service 142 on the content-sharing platform 130 to permit the formation of rules or the generation of a model to predict the user's background playback preferences. For example, the media viewer 112 may collect information regarding user interactions or actions and provide them to the background behavior service 142. For example, user action information may include information indicating that upon sending the media viewer 112 to the background on the client device 110A, the user disconnected external speakers (e.g., headphones). This information may be interpreted by the background behavior service as indicating that the user does not want the audio component to continue when the video component is suspending by entrance to a background mode. In some instances, the background behavior service 142 may be provided with information about the media item being played when the user sends the media viewer 112 to the background and disconnects external speakers. Such information may include that the media item is a feature film. In some embodiments, rules formulated from this information may be applied only when a media item that was being viewed is a feature film. The background behavior service 142 may also be provided with user data 140A-N from the user service 136, and so may indicate that the user frequently consumes media items that are music videos, and rarely disconnects speakers from the client device when consuming the music videos. This may provide additional input to a model to indicate that the user does not want to suspend playing an audio component of a music video when the media viewer 112 enters a background mode. Or the background behavior service 142 may recognize that a media item being consumed is from a playlist, and so may permit playback of the playlist to continue, with the video component of each of the playlist not being played while the audio of each of the media items in the playlist plays in sequence according to the playlist.

As an additional example, if a user sends the media viewer 112 into a background mode by switching to another app on the client device 110A, and then returns within a short amount of time (e.g., 5 seconds or less) to the media viewer 112 to pause the playback of the media item, this may indicate that the user does not want the media item, including an audio component and a video component, to continue playing in the background. A rule may be generated to prevent background audio playback of any media item (or the specific media item that was playing or any media item of the same type as the specific media item) under such circumstances.

As another example, if a user sends the media viewer 112 into the background by turning off the display and the audio component continues playing, and then the user mutes the phone (either by using a mute button or by decreasing the volume to zero with a volume controller), this may be interpreted by the background behavior service 142 as indicating that the user does not want the audio component to continue playing in such circumstances. The background behavior service 142 may formulate a rule directing that when the user turns off the display of the client device 110A while playing a media item, the audio component of the media item should also be stopped. Again, this rule may be limited to the specific media item being played, or it may be applied to all media items or to a subset of media items such as a specific category of media items. Thus, the rule may cause the audio component of a "television" show to be suspended when the video component of the show ceases to be played, while continuing the playback of the audio component of a music video when the video component of the music video is stopped.

In some embodiments, these rules may be used in the creation of a model that predicts what a user would prefer to occur when other events cause the media viewer 112 to enter a background mode. Additionally, in some embodiments, the features described herein in connection with the background behavior service 142 may be performed by the background behavior service 114 executing on any of the client devices 110A-N. In some embodiments of the system architecture 100, the background behavior service 142 may be absent, may be redundant, or may provide background playback behavior services to a subset of client devices 110A-N that does not have the background behavior service 114 executing thereon.

In situations in which the systems discussed here collect personal information about users from the users or from users' devices, such as user actions or consumption histories, or make use of personal information, the users may be provided with an opportunity to control whether the content-sharing platform 130 collects user information (e.g., information about a user's social network, social actions or activities, profession, a user's preferences, a user's current location, or a user's consumption history), or to control whether and/or how to receive content from the content-sharing platform 130 that may be more relevant to the user. In addition, certain data may be treated in one or more ways before it is stored or used, so that personally identifiable information is removed. For example, a user's identity may be treated so that no personally identifiable information can be determined for the user. Thus, the user may have control over how information is collected about and from the user and used by the content-sharing platform 130 in the formation and/or implementation of adaptive background playback preferences.

Figure 2:
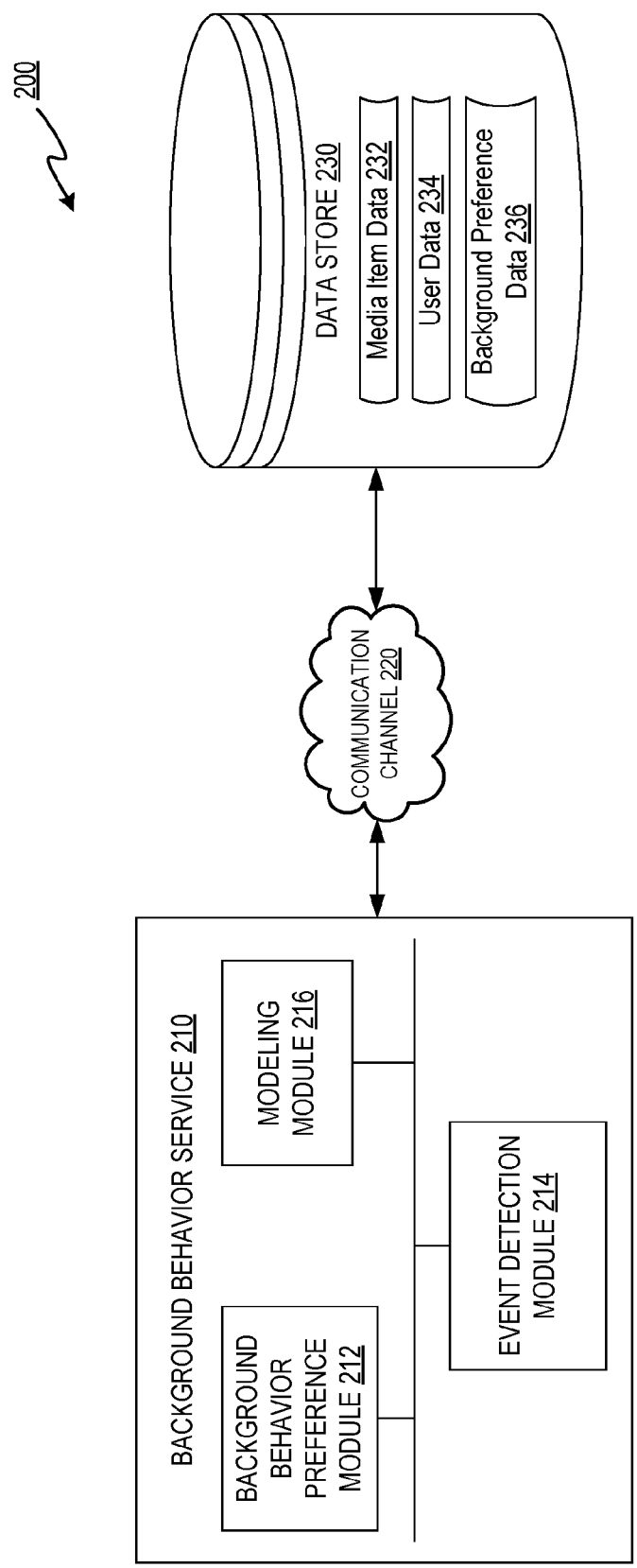
FIG. 2 illustrates a background playback behavior system, in accordance with some embodiments of the disclosure.

FIG. 2 illustrates a background playback behavior system 200, in accordance with some embodiments of the disclosure. The background playback behavior system 200 of FIG. 2 may provide the background behavior service 142 and/or the background behavior service 114 of FIG. 1, described above. As illustrated in FIG. 2, the background playback behavior system 200 includes a background behavior service 210 that is coupled by a communication channel 220 to a data store 230. The background behavior service 210 may include several components. In the illustrated embodiment, the background behavior service 210 includes a background behavior preference module 212, an event detection module 214, and a modeling module 216. Each of the modules 212, 214, and 216 may be provided by a dedicated hardware component, by instructions executing on a processing device, or by a combination thereof.

The background behavior preference module 212 may receive inputs to formulate one or more background behavior preferences. The preferences may be formulated as logic rules that map inputs to an output condition. For example, the inputs may include one or more events, such as user actions with respect to the user's device or to a media viewer executing on the user's device.

Some such events may include a request to turn off a display of the user's device, which may be created by the actuation of a sleep/wake button, an activation of a physical button (e.g., a home button) on the user's device, an activation of a virtual button (e.g., a back button or a navigation button) on the user's device, a request to bring a second application into a foreground of the user's device, a navigation command in the media viewer, or any request that causes the media viewer to enter a background mode of the user's device. Other events may include a request to pause playback of a media item, the connecting or disconnecting of an external speaker, which may be physically coupled or wirelessly coupled to the user's devices, or the muting of the user's device by selection of a mute button or by diminution of audio volume by actuation of a volume button.

One or more of these exemplary events may be detected by the event detection module 214. The event or events may be identified by the event detection module 214 and provided as data to the background behavior preference module 212. As described, the background behavior preference module 212 may use the information regarding the event or events to identify one or more applicable background playback preferences. Where the background playback preference is formulated as a rule, the rule applicable to the event or events that occurred may be determined and applied to determine whether to continue playing the audio component of a media item while stopping the playing of a video component of that media item, to continue playing the video component while stopping the audio component, to continue playing both components in the background, or to suspend playing both components when the media view enters the background.

The event detection module 214 may provide the background behavior preference module 212 with additional information. In some embodiments, this additional information may include contextual information detailing the circumstances surrounding the event. For example, the event detection module 214 may indicate to the background behavior preference module 212 that the user turned off the display by pushing a sleep/wake button. The event detection module 214 may also indicate that the user's action occurred 10 seconds (or some other absolute or relative duration of time) before the media item would have completed playing. This contextual information may indicate that the user is not interested in hearing the rest. Alternatively, this contextual information may indicate that playing the audio component to completion would not take a lot of time, and so should be continued. Contextual information may indicate that an action is taken early in the playing of a media item. This may be used to create a rule that continues playback if the media viewer 112 is sent to the background within 10 seconds of the initiation of playback, but if the media viewer 112 is sent to the background more than 10 seconds after initiation of playback. Thus, the current place in a media item may be provided by the event detection module 214 to the background behavior preference module 212.

Some additional information may be accessed via the communication channel 220 from the data store 230. For example, the additional information may include information from media item data 232, which may include a title of the media item, a local identifier, a content-sharing platform identifier of the media item, a type or category of the media item, and other information. The additional information used by one or more components of the background behavior service 210 may include user data 234, such as an identifier or username of the user, an identifier of the user's device, such as a media access control (MAC) address or Internet Protocol (IP) address, an international mobile station equipment identity (IMEI) number, etc. In some embodiments, the user data 234 may include a consumption history of the user.

In some embodiments, the data store 230 may also store background preference data 236, which may include one or more background playback preferences. The background playback preferences may be stored in the data store 230 as rules, settings, or as a model. The background behavior service 210 may further include a modeling module 216 that provides a model of a user's background playback preferences, or of a composite of users' background playback preference, in order to predict how the user would like the audio and video components of a media item to be handled when an event is detected by the event detection module 214.

As illustrated in FIG. 2, the background behavior service 210 may be the background behavior service 142. In such an embodiment, the communication channel 220 may be the network 120 and the data store 230 may be the data store 150. The data store 230 of FIG. 2 may also include features of the content-sharing platform 130 of FIG. 1, such as the media item data store 133 and the user data 140A-N. In other embodiments, the background behavior service 210 may be the background behavior service 114 of the client devices 110A-N. In such embodiments, the communication channel 220 may be a communication channel internal to the client devices 110A-N, such as a system bus. The data store 230 may be a memory of the client devices 110A-N.

Figure 3:
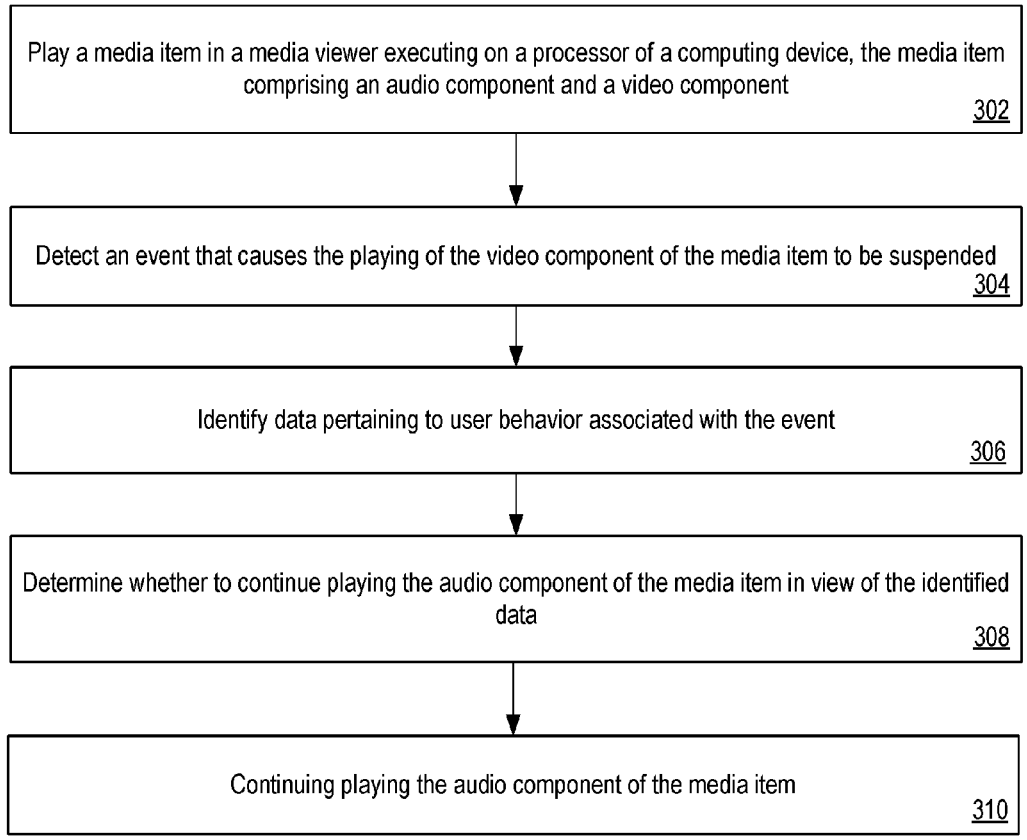
FIG. 3 is a flow diagram of a method of adapting background playback behavior, according to some embodiments of the disclosure.

FIG. 3 is a flow diagram of a method 300 of providing adaptive background playback behavior, in accordance with some aspects of the present disclosure. The method 300, and other methods described herein, may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the method 300 and other methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program, including a set of instructions, accessible from any non-transitory, tangible computer-readable device or storage medium.

In one embodiment, method 300 may be performed by any of the client devices 110A-N and subsystems thereof as shown in FIG. 1. For example, one or more operations of the method 300 may be performed by one of the client devices 110A-N. In some embodiments, one or more of the operations of the method 300 may be performed by the content-sharing platform 130.

Embodiments of the method 300 may begin at block 302 in which processing logic plays a media item in a media viewer executing on a processor of a computing device. The media item includes multiple components, such as an audio component and a video component. For example, the media item may be a music video from a playlist of media items provided by the content-sharing platform 130. At block 304, the processing logic detects an event intended to cause the playing of the video component of the media item to be suspended. In some embodiments, the processing logic may detect an event that causes the playing of the audio component to be suspended. The event may be detected by a background behavior service, such as the background behavior service 210 of FIG. 2, which includes an event detection module 214 to detect one or more events. The event may be a user action that causes the playing of the video component to be suspended or to pause and enter a background mode. The events may include the user turning off the display of the computing device, going to the home screen on the computer device, switching between apps, actuating of a back button, or performing actions or commands to navigate within an app to another page within the app. Other events may include the connection or disconnection of external speakers or external displays, which may be coupled with wired connections or wirelessly. In some embodiments, causing the playing of the video component of the media item to be suspended may be causing the playing of the video component to be suspended such that the user device stops receiving data associated with the video component.

At block 306, the processing logic may identify data pertaining to user behavior associated with the event. Such user data may provide and include context for the event, such as information regarding a sequence of user actions and the timing of that sequence. For example, if a user caused the media viewer to stop playing the video component by forcing the media viewer to the background shortly after starting the playing of the media item in the media viewer (e.g., within 5 seconds of starting), the time between these user actions may be identified. Another example of data pertaining to the user behavior may be a setting of the media viewer as provided by the user or set by default. Such settings may be set in a settings menu of the media viewer. In some embodiments, the user behavior associated with an event may be the absence of user action when an event occurs, such that the user's behavior may be understood to indicate approval of the handling of the event. When an event occurs, the event may be used as an index to perform a lookup in a table of settings. For example, after an event is detected by the event detection module 214, information may be obtained from the background playback preference data 236. Such information may include an applicable rule, obtained from the background playback preference data 236. In some embodiments, the background behavior service 142 or 114 may use information indicating how the user requested the media item to begin playing initially. For example, if the user requested that the media item play by selecting a link on a web page or by selecting a link on a web page, and the user actuates the back button, an appropriate background playback preference may be to suspend the playing of the audio component. It may be inferred from these actions that the user wants to return to the source of the link, and does not want to continue to receive the media item accessed via the link.

At block 308, the processing logic determines whether to continue playing the audio component of the media item in view of the identified data. For example, the background playback behavior preference module 212 may receive information regarding the event, contextual information, and/or a rule that is applicable to occurrences of the event. Using the event and the information, the background behavior service 210 may apply the rule to determine that the audio component should continue to play. In embodiments in which an event causes the audio component to stop playing, the determination may be a determination of whether the video component should continue playing. The determination may be made by applying a rule using an event and additional information as inputs, in some embodiments. The determination can be made on the client device, or the identified data may be sent to the content sharing platform 130, which can make a decision and provide instructions to the media player of the media viewer 112 on the client device.

In other embodiments, the determination may be made using a behavioral model (e.g., by providing the event and additional information as input to a behavioral model). Based on the provided input, the behavioral model may predict whether or not the user would want the audio component to continue playing given the particular event and the additional information. In some instances, the behavioral model may represent a composite set of rules. For example, the composite set of rules may be the most common rules applied to user devices of users of the content-sharing platform 130.

Thus, if most of the users of the content-sharing platform have a background playback preference that directs that the audio component continue playing when a user puts the display of the user's device to sleep within 5 seconds of beginning the playing of a media item that is categorized as a lyric video, the behavioral model may provide for such an action on another user's device in the same circumstances. The behavioral model may operate on or be defined by the background behavior service 142 of the content-sharing platform 130, and may have access to large amounts of preference data 146A-N for many users, stored in a data store 144. In some embodiments, the preference data 146A-N may be provided on the data store 150. The preference data 146A-N for multiple users may facilitate the prediction of the background playback preferences of other users.

At block 310, the processing logic continues playing the audio component of the media item. When the determination is made by the background behavior service 210 to continue playing the audio component, and while the video component is stopped in the background, the audio component may continue to play on the user's device. In some embodiments, the processing logic may not continue playing the audio component of the media item, but may suspend the playback of the audio component as well as the video component of the media item.

Figure 4:
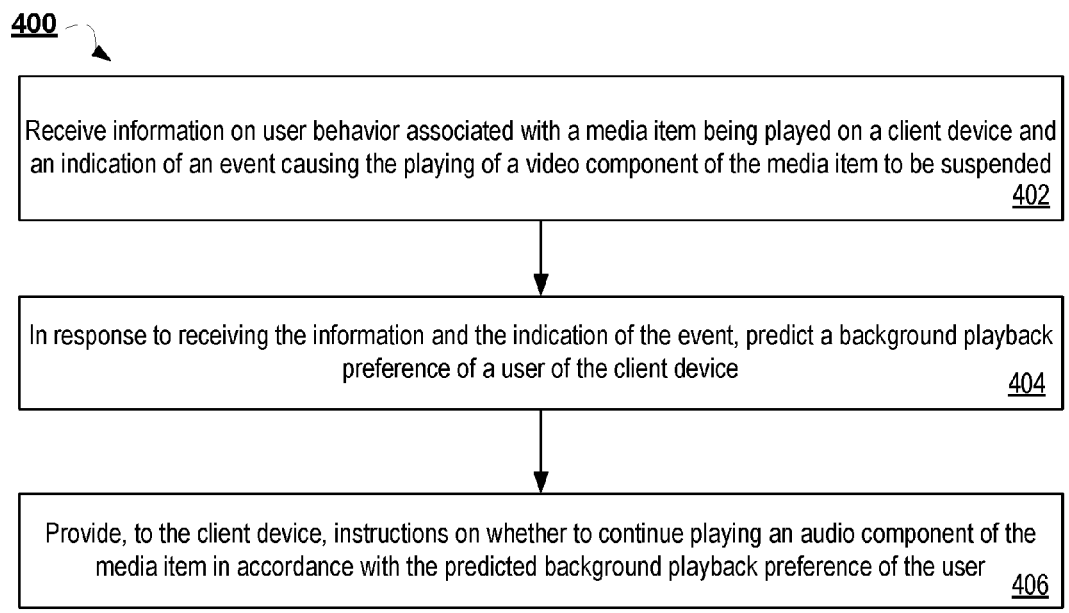
FIG. 4 is a flow diagram of another method of adapting background playback behavior, in accordance with some embodiments of the disclosure.

FIG. 4 is a flow chart of a method 400 of providing adaptive background playback behavior, in accordance with some aspects of the present disclosure. In one embodiment, method 400 may be performed by the content-sharing platform 130 and subsystems thereof as shown in FIG. 1.

Embodiments of the method 400 may begin at block 402, at which the processing logic receives information on user behavior associated with a media item being played on a client device. The processing logic may also receive an indication of an event causing the playing of the video component of the media item to be suspended. For example, the background behavior service 142 of the content-sharing platform 130 may receive the information on user behavior and the indication of the event from a client device 110A. In some embodiments, the background behavior service 114 on the client device 110A communicates the information and the indication to the background behavior service 142 on the content-sharing platform 130. The information on user behavior may include adjustments to the volume of the client device 110A, a setting or a change in a setting, a current place in the media item, etc. The event may include any user action causing the playing of the video component to enter a background mode, in which the media viewer 112 is no longer displayed on a display of the client device 110A or on a display coupled to the client device 110A.

At block 404, in response to receiving the information and the indication of the event, the processing logic may predict a background playback preference of a user of the client device. For example, the processing logic may predict that the user wants the audio component of the media item to continue playing even when the video component stops playing. This prediction may be based on the category of the media item, or the user's actuation of a sleep/wake button putting the display of the client device to sleep shortly after requesting to play the media item, etc. The prediction may be based on whether or not the media item is being played as a result of a selection by the user to play multiple media items in a playlist. Many different events and other information may be used to predict a user's background playback preferences, as discussed in greater detail above.

At block 406, the processing logic may provide instructions, to the client device, on whether to continue playing an audio component of the media item in accordance with the predicted background playback preference of the user. For example, the background behavior service 142 of the content-sharing platform 130 may provide instructions to the background behavior service 114 or directly to the media player of the media viewer 112 to continue playing the audio component of the media item. This preference may have been predicted by the background behavior service 142. The instructions may be provided to the background behavior service 114 based on a previously derived rule that describes how the audio component should be handled when the video component is sent to the background given the indication of the event and the information on user behavior. In some embodiments, the prediction may be based on the known preferences of many users of the content-sharing platform 130, stored in or obtained from the preference data 146A-N. For instance, the background behavior service 142 may predict that the user may desire the same background playback preference of the majority of users of the content-sharing platform 130, and may provide instructions that implement that preference. Or the background behavior service 142 may identify a subset of users having one or more characteristics in common with the user and provide the most common preferences of the subset to the user. In some embodiments, the background behavior service 114 may provide instructions to a processor of the client device 110A.

Embodiments described herein may enable adaptive background playback for a user on a user device. The adaptive background playback preferences may enable one component of a media item, such as an audio component, to continue playing when another component of the media item, such as a video component, is sent to the background on the user device. The audio component may continue playing when the video component stops or is suspended based on the event or events that caused the video component to stop play, based on other user actions, and based on characteristics of the media item and other contextual information. Thus, the audio component may stop when a event is detected, but may continue when a different event is detected. The audio component may continue playing when a first event is detected and information regarding a first user action is collected and received, while the audio component may stop playing when the first event is detected and information regarding a different user action is collected and received. Thus, these systems and methods provide for adaptive background playback.

Figure 5:
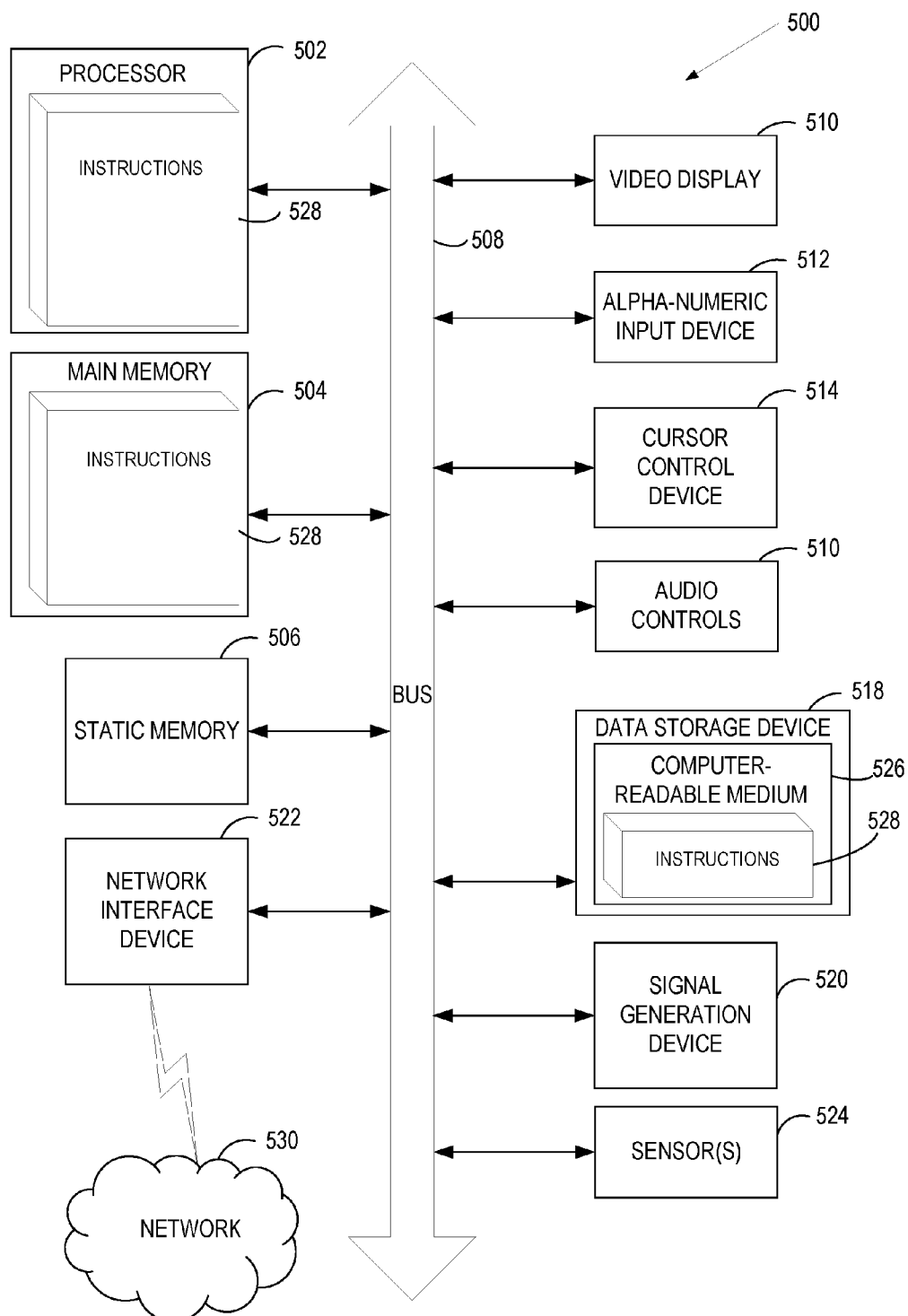
FIG. 5 is a block diagram illustrating an exemplary system architecture, according to some embodiments.

FIG. 5 illustrates a diagrammatic representation of a machine in the exemplary form of a computer system 500 within which a set of instructions or sets of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like, having one or more cores. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 528 for performing the operations and steps discussed herein. For example, the processor 502 may execute instructions 528 to perform methods 300 and 400 as shown herein in FIGS. 3 and 4. In some embodiments, the processor 502 provides the background behavior service(s) 114, 142, and/or 210 of FIGS. 1 and 2, respectively.

The computer system 500 may further include a network interface device 522. The network device 522 may include a plurality of network interface components, with each components being adapted for different modes of communication. For example, the network interface components may include an 802.11 transceiver, a Bluetooth® transceiver, and an interface for communicating with one or more cellular networks. The computer system 500 also may include a video display unit 510 (e.g., a liquid crystal display (LCD), a cathode ray tube (CRT), or a touch screen), an alphanumeric input device 512 (e.g., a physical keyboard or a virtual keyboard), a cursor control device 514 (e.g., a mouse or touch-screen sensor system), and a signal generation device 520 (e.g., audio processing circuitry and a speaker). The computer system 500 may further include one or more sensors 524, such as a motion sensor and/or an ambient light sensor. The sensors 524 may be used to provide other behavioral information or context. For example, if the user places the computer system 500 in the user's pocket, one of the sensors 524 may detect the change in ambient light and use that as input in the determination to suspend the playback of the video component of the media item and continue the playback of the audio component. A particular motion, such as a sudden motion caused by picking up the computer system 500 off of a table may also be provided by one of the sensors 524 to an adaptive background playback system as data pertaining to the user's behavior.

The data storage device 518 may include a non-transitory computer-readable storage medium 526 on which is stored one or more sets of instructions 528 (e.g., software) embodying any one or more of the services, methodologies, or functions described herein. The instructions 528 may also reside, completely or at least partially, within the main memory 504 and/or within the processor 502 during execution thereof by the computer system 500, the main memory 504 and the processor 502 also constituting computer-readable storage media. The instructions 528 may further be transmitted or received over a network 530 via the network interface device 522.

In one embodiment, the instructions 528 include instructions for a media providing a media item storage, a user service, a background behavior service, a media viewer or other features which may correspond, respectively, to identically-named counterparts described with respect to FIGS. 1, 2, and 3, and/or a software library containing methods for providing adaptive background playback behavior to be applied on a user device when the user consumes media items. While the computer-readable storage medium 526 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "monitoring", "determining", "receiving", "identifying", "generating", "maintaining" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to a system for performing the operations herein. This system may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Reference throughout this specification to "one embodiment" or "an embodiment" means that a particular feature, structure, or characteristic described in connection with the embodiment is included in at least one embodiment. Thus, the appearances of the phrase "in some embodiments" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, for determining playback behavior of a media item including a video component and an audio component, the method comprising:
    identifying an occurrence of a current event that causes a playing of the video component of the media item on a screen of a user device to be suspended;
    predicting, by a processing device, user playback preferences for the media item using a behavioral model trained on previous events corresponding to the current event;
    determining, by the processing device responsive to the identification of the occurrence of the current event, to continue playing the audio component of the media item, based on the predicted user playback preferences for the media item; and
    responsive to the determination, playing the audio component of the media item while playback of the video component is suspended.

2. The method of claim 1, wherein the behavioral model is trained using data pertaining to user behavior associated with the event.

3. The method of claim 1, wherein the behavioral model is trained using content type of the media item.

4. The method of claim 1, wherein the event is a request to turn off a display of the computing device.

5. The method of claim 2, wherein the data pertaining to the user behavior associated with the event comprises a user-initiated change in a hardware status of the computing device.

6. The method of claim 2, wherein the user behavior associated with the event is at least one of behavior of a user of the user device or behavior of users of other user devices.

7. The method of claim 5, wherein the hardware status is a connectedness to an external speaker.

8. A non-transitory computer-readable storage medium storing instructions that, when executed by a processing device, cause the processing device to perform a method for determining playback behavior of a media item including a video component and an audio component, the method comprising:
    identifying an occurrence of a current event that causes a playing of the video component of the media item on a screen of a user device to be suspended;
    predicting, by a processing device, user playback preferences for the media item using a behavioral model trained on previous events corresponding to the current event;
    determining, by the processing device responsive to the identification of the occurrence of the current event, to continue playing the audio component of the media item, based on the predicted user playback preferences for the media item; and responsive to the determination, playing the audio component of the media item while playback of the video component is suspended.

9. The non-transitory computer readable medium of claim 8, wherein the behavioral model is trained using data pertaining to user behavior associated with the event.

10. A system for determining playback behavior of a media item including a video component and an audio component, the system comprising:
    a memory; and
    a processing device, coupled to the memory, to:
        identify an occurrence of a current event that causes a playing of the video component of the media item on a screen of a user device to be suspended;
        predict user playback preferences for the media item using a behavioral model trained on previous events corresponding to the current event;
        determine, responsive to the identification of the occurrence of the current event, to continue playing the audio component of the media item, based on the predicted user playback preferences for the media item; and
        responsive to the determination, play the audio component of the media item while playback of the video component is suspended.

11. The system of claim 10, wherein the behavioral model is trained using data pertaining to user behavior associated with the event.

12. The system of claim 10, wherein the behavioral model is trained using content type of the media item.

13. The system of claim 10, wherein the event is at least one of:
- a request to turn off a display of the computing device;
- an activation of a physical button on the computing device;
- an activation of a virtual button on the computing device;
- a request to send a media viewer playing the media item to a background mode of the computing device;
- a request to bring a second application into a foreground of the computing device; or
- a navigation command in the media viewer.

14. The system of claim 11, wherein the data pertaining to the user behavior associated with the event comprises a user-initiated change in a hardware status of the computing device.

15. The system of claim 11, wherein the user behavior associated with the event is at least one of behavior of a user of the user device or behavior of users of other user devices.

16. The method of claim 1, wherein the event is an activation of a physical button on the computing device.

17. The method of claim 1, wherein the event is an activation of a virtual button on the computing device.

18. The method of claim 1, wherein the event is a request to send a media viewer playing the media item to a background mode of the computing device.

19. The method of claim 1, wherein the event is a request to bring a second application into a foreground of the computing device.

20. The method of claim 1, wherein the event is a navigation command in a media viewer playing the media item.

* * * * *